United States Patent
Lim et al.

(10) Patent No.: US 11,795,268 B2
(45) Date of Patent: Oct. 24, 2023

(54) FUNCTIONAL RESIN COMPOSITION COMPRISING BIOMASS-DERIVED COMPONENT

(71) Applicant: ANKOR BIOPLASTICS CO., LTD., Wonju-si (KR)

(72) Inventors: Heon-Young Lim, Wonju-si (KR); Seung-Lyul Choi, Wonju-si (KR); Yoon Cho, Wonju-si (KR)

(73) Assignee: ANKOR BIOPLASTICS CO., LTD., Wonju-si (KR)

( * ) Notice: Subject to any disclaimer, the term of this patent is extended or adjusted under 35 U.S.C. 154(b) by 303 days.

(21) Appl. No.: 17/309,258

(22) PCT Filed: May 15, 2019

(86) PCT No.: PCT/KR2019/005832
§ 371 (c)(1),
(2) Date: May 12, 2021

(87) PCT Pub. No.: WO2020/101131
PCT Pub. Date: May 22, 2020

(65) Prior Publication Data
US 2022/0002480 A1  Jan. 6, 2022

(30) Foreign Application Priority Data
Nov. 12, 2018  (KR) .................. 10-2018-0138493

(51) Int. Cl.
*C08G 63/672* (2006.01)
*C08G 63/183* (2006.01)
*C08G 63/20* (2006.01)
*C08G 63/60* (2006.01)

(52) U.S. Cl.
CPC .......... *C08G 63/672* (2013.01); *C08G 63/183* (2013.01); *C08G 63/20* (2013.01); *C08G 63/60* (2013.01)

(58) Field of Classification Search
CPC ...... C08G 63/183; C08G 63/20; C08G 63/60; C08G 63/672; C08L 67/02
See application file for complete search history.

(56) References Cited

U.S. PATENT DOCUMENTS

| | | | |
|---|---|---|---|
| 3,300,444 A * | 1/1967 | Greenlee | C08G 65/40 |
| | | | 562/468 |
| 4,314,049 A | 2/1982 | Yasuda | |
| 4,594,291 A * | 6/1986 | Bertram | C08G 59/00 |
| | | | 528/109 |
| 2018/0171071 A1 | 6/2018 | Aoshima et al. | |
| 2018/0201727 A1 * | 7/2018 | Yang | C08G 63/6926 |

FOREIGN PATENT DOCUMENTS

| | | |
|---|---|---|
| JP | 2008-094888 A | 4/2008 |
| KR | 10-2005-0106147 A | 11/2005 |
| KR | 10-2012-0134937 A | 12/2012 |

OTHER PUBLICATIONS

D. Foix et al "Synthesis of a New Hyperbranched-Linear-Hyperbranched Triblock Copolymer and Its Use as a Chemical Modifier for the Cationic Photo and Thermal Curing of Epoxy Resins", Journal of Polymer Science Part A: Polymer Chemistry 2012, 50, 1133-1142 (Year: 2011).*
Antje Ziemer et al "Temperature Dependent Studies of Molecular Interactions in a Low-Molecular Weight Ester Diol Mixed with a Hyperbranched Polyester Additive", Macromol. Chem. Phys. 2003, 204, 1275-1283 (Year: 2003).*
Cemil Dizman et al "Recent advances in the preparation of functionalized polysulfones", Polym Int 2013; 62: 991-1007 (Year: 2013).*
International Search Report and Written Opinion for International application No. PCT/KR2019/005832, dated Sep. 9, 2019, ISA/KR.

* cited by examiner

*Primary Examiner* — Frances Tischler
*Assistant Examiner* — Gennadiy Mesh
(74) *Attorney, Agent, or Firm* — LEX IP MEISTER, PLLC

(57) ABSTRACT

A functional resin composition comprising a biomass-derived component; an aromatic dicarboxylic acid; an alcohol component; a chain extender; and a multifunctional compound. The biomass-derived component is biomass-derived succinic acid or mixture with fossil-derived aliphatic dicarboxylic acid. The multifunctional compound is obtained by reaction of 4,4-bis(4-hydroxyphenyl)valeric acid and polyethylene glycol. The functional resin composition has excellent processability, moldability, tearing strength, tensile strength and excellent resistance to hydrolysis.

7 Claims, No Drawings

FUNCTIONAL RESIN COMPOSITION COMPRISING BIOMASS-DERIVED COMPONENT

CROSS-REFERENCE TO RELATED APPLICATION

This application is a 371 U.S. national stage of PCT/KR2019/005832, filed May 15, 2019, which claims the benefit of Korean Patent Application No. 10-2018-0138493 filed Nov. 12, 2018 and the contents of each of which are incorporated herein by reference.

TECHNICAL FIELD

The present invention relates to a functional resin composition comprising a biomass-derived component, and more particularly to a functional resin composition comprising a biomass-derived component, which has excellent processability, moldability, tearing strength and tensile strength and does not easily change over time due to its excellent hydrolysis resistance.

BACKGROUND ART

Synthetic resins can be produced in large amounts by various methods, and are also excellent in lightweight, durability, price competitiveness, chemical resistance and mechanical properties. Thus, these synthetic resins are widely used in food packaging, medicine packaging, agricultural packaging, and industrial packaging, as well as human life in modern society.

However, these synthetic resin materials are disposed of through processes such as landfill or incineration after their use. When these resins are disposed of by landfill, a problem arises in that it takes a very long time for the resins to be degraded in the soil, and when the resins are disposed of by incineration, a problem arises in that they generate toxic gases such as dioxin.

Environmental pollution caused by synthetic resins is now reaching a level of concern in the world. As one of solutions to this problem, the development of biodegradable resins for disposable products has been actively carried out.

Biodegradable resins are resins which are finally decomposed into water and carbon dioxide by soil or aquatic microorganisms. Biodegradable resins developed to date include polylactic acid (PLA) synthesized by the ring-opening reaction of lactic acid or lactide in the presence of a chemical catalyst or an enzyme, polycaprolactone chemically synthesized from an ε-caprolactone monomer as a starting material, aliphatic polyesters based on diol-dicarboxylic acid, and polyhydroxybutyrate (PHB) synthesized in vivo by microorganisms. The most representative of these materials are polylactic acid (PLA) and an aliphatic (or aliphatic/aromatic) polyester obtained by the polymerization of diol and dicarboxylic acid.

Among them, polylactic acid is the most environmentally friendly product derived from biomass resources, but its application is limited due to insufficient physical properties, such as low heat resistance temperature, strong brittleness and the like, as well as slow biodegradation rate.

Unlike this, aliphatic (or aliphatic/aromatic) polyesters produced from diol and dicarboxylic acid have properties similar to those of polyethylene, polypropylene and the like, and thus are expected to be an alternative to synthetic resins.

However, the above-described biodegradable polyester resins produced using biomass-derived raw materials have an sufficient degree of completion of reaction due to the impurities contained in the biomass-derived raw materials, and hence are more easily hydrolyzed than polyesters produced using fossil-derived raw materials, and thus pose a problem in terms of durability.

PRIOR ART DOCUMENTS

Patent Documents (Patent Document 0001) Korean Patent No. 10-0722516 (May 21, 2007);

(Patent Document 0002) Korean Patent Application Publication No. 10-2013-0118221 (Oct. 29, 2013);

(Patent Document 0003) Korean Patent No. 10-1276100 (Jun. 12, 2013).

DISCLOSURE OF INVENTION

Technical Problem

It is an object of the present invention to provide a functional resin composition comprising a biomass-derived component, which has excellent processability, moldability, tearing strength and does not easily change over time due to its excellent hydrolysis resistance.

Solution to Problem

The above object is achieved by providing a functional resin composition comprising: a biomass-derived component; an alcohol component; a chain extender; and a multifunctional compound, wherein the biomass-derived component is biomass-derived succinic acid alone or a mixture of biomass-derived succinic acid and fossil-derived aliphatic dicarboxylic acid.

According to a preferred feature of the present invention, the fossil-derived aliphatic dicarboxylic acid may be one or more selected from the group consisting of oxalic acid, malonic acid, succinic acid, glutaric acid, adipic acid, pimelic acid, suberic acid, azelaic acid, sebacic acid, and anhydride derivatives thereof.

According to another preferred feature of the present invention, the alcohol component may be one or more selected from the group consisting of biomass-derived 1,4-butanediol and fossil-derived aliphatic diol.

According to still another preferred feature of the present invention, the fossil-derived aliphatic diol may be one or more selected from the group consisting of ethylene glycol, 1,3-propanediol, neopentyl glycol, propylene glycol, 1,2-butanediol, 1,4-butanediol, and 1,6-hexanediol.

According to still another preferred feature of the present invention, the chain extender may be an isocyanate compound or a carbodiimide compound.

According to still another preferred feature of the present invention, the multifunctional compound may be a compound represented by the following formula 1, which is produced by esterification of 1,4-bis(4-hydroxyphenyl)valeric acid with polyethylene glycol:

Formula 1

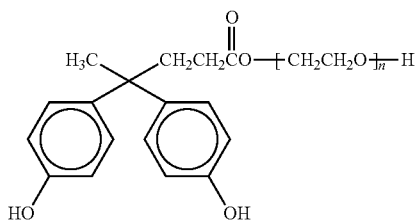

wherein n is an integer ranging from 8 to 10.

According to still another preferred feature of the present invention, the multifunctional compound may be a compound represented by the following formula 2, which is produced by esterification of DL-malic acid with 1,4-cyclohexanedimethanol under a nitrogen atmosphere.

Formula 2

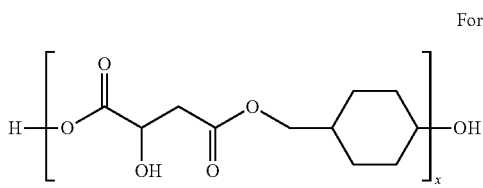

wherein X is an integer ranging from 3 to 5.

According to still another preferred feature of the present invention, the functional resin composition may further comprise aromatic dicarboxylic acid. The aromatic dicarboxylic acid may be any one or more selected from the group consisting of dimethyl terephthalate, terephthalic acid, isophthalic acid, and naphthoic acid.

Advantageous Effects of Invention

As described above, the functional resin composition comprising a biomass-derived component according to the present invention provides a functional resin, which has excellent processability, moldability, tearing strength and tensile strength and does not easily change over time due to its excellent hydrolysis resistance.

BEST MODE FOR CARRYING OUT THE INVENTION

Hereinafter, preferred embodiments of the present invention and the physical properties of each component will be described in detail. However, these embodiments are intended to illustrate the present invention such that those skilled in the art can easily carry out the present invention, and the technical spirit and scope of the present invention are not limited by these embodiments.

A functional resin composition according to the present invention comprises a biomass-derived component, an alcohol component, a chain extender, and a multifunctional compound.

Furthermore, the functional resin composition according to the present invention may further comprise aromatic dicarboxylic acid in addition to the biomass-derived component, the alcohol component, the chain extender and the multifunctional compound.

The biomass-derived component is biomass-derived succinic acid alone or a mixture of biomass-derived succinic acid and fossil-derived aliphatic dicarboxylic acid. Here, the fossil-derived aliphatic dicarboxylic acid is preferably one or more selected from the group consisting of oxalic acid, malonic acid, succinic acid, glutaric acid, adipic acid, pimelic acid, suberic acid, azelaic acid, sebacic acid, and anhydride derivatives thereof.

The biomass-derived succinic acid that is used as an essential component in the present invention is used to enhance the environmentally friendly nature of aliphatic and aromatic copolyesters which are produced from conventional fossil-derived raw materials, and it is obtained by fermentation, extraction, purification and the like from materials, including starch and cellulose, which are obtained by plant photosynthesis. In the present invention, commercialized succinic acid products derived from plant resources as described above may be used without any particular post-treatment.

Furthermore, the fossil-derived aliphatic dicarboxylic acid preferably has 0 to 8 carbon atoms, and is more preferably one or a mixture of two or more selected from the group consisting of oxalic acid, malonic acid, succinic acid, glutaric acid, adipic acid, pimelic acid, suberic acid, azelaic acid, sebacic acid, and anhydride derivatives thereof.

The alcohol component is one or more selected from the group consisting of biomass-derived 1,4-butanediol and fossil-derived aliphatic diol. Here, the fossil-derived aliphatic diol is preferably one or more selected from the group consisting of ethylene glycol, 1,3-propanediol, neopentyl glycol, propylene glycol, 1,2-butanediol, 1,4-butanediol, and 1,6-hexanediol.

The chain extender is an isocyanate compound or a carbodiimide compound. Here, the isocyanate compound is preferably any one selected from the group consisting of 1,6-hexamethylene diisocyanate, isophorone diisocyanate, 4,4'-diphenylmethane diisocyanate, and 2,2'-diphenylmethane diisocyanate.

The carbodiimide compound is any one selected from among 1,3-dicyclohexylcarbodiimide, HMV-8CA (commercially available from Nisshinbo Industries, Inc.), HMV-10B (Nisshinbo Industries, Inc.), STABILIZER 9000 (Raschig GmbH), STABILIZER 7000 (Raschig GmbH), bis-(2,6-diisopropyl-phenylene-2,4-carbodiimide), and poly-(1,3,5-triisopropylene-phenylene-2,4-carbodiimide).

The aromatic dicarboxylic acid, an additional component that may be added to the functional resin composition, is preferably any one or more selected from the group consisting of dimethyl terephthalate, terephthalic acid, isophthalic acid, and naphthoic acid.

The multifunctional compound is preferably a compound a compound represented by the following formula 1, which is produced by esterification of 1,4-bis(4-hydroxyphenyl) valeric acid with polyethylene glycol:

Formula 1

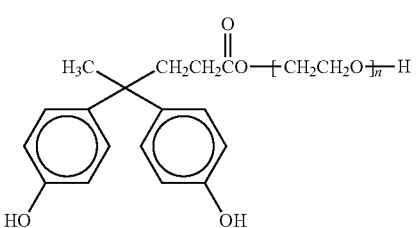

wherein n is an integer ranging from 8 to 10.

Alternatively, the multifunctional compound is preferably a compound represented by the following formula 2, which is produced by esterification of DL-malic acid with 1,4-cyclohexanedimethanol under a nitrogen atmosphere.

Formula 2

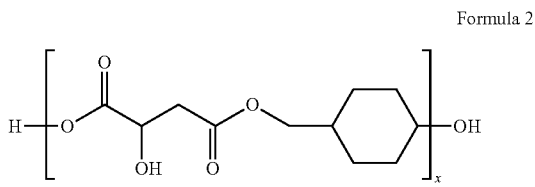

wherein X is an integer ranging from 3 to 5.

The multifunctional compound represented by formula 1, which is produced by esterification of 1,4-bis(4-hydroxyphenyl)valeric acid with polyethylene glycol, is produced by esterifying 1,4-bis(4-hydroxyphenyl)valeric acid with a polyethylene glycol having an average molecular weight of 400 at 210° C. for 2 hours in the presence of a catalyst. The process of producing the multifunctional compound having the structure represented by formula 1 is shown in the following reaction scheme 1:

Reaction Scheme 1

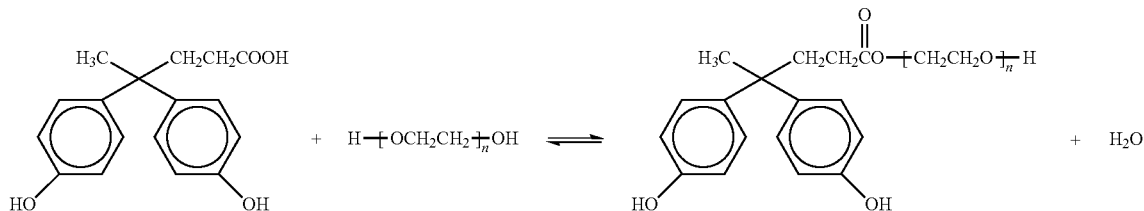

wherein n is an integer ranging from 8 to 10.

The multifunctional compound represented by formula 1, which is produced by the process shown in reaction scheme 1 above, is introduced in the step of performing an esterification reaction between aliphatic dicarboxylic acid and aliphatic diol during synthesis of the aliphatic/aromatic copolyester which is a product. It functions to enhance the reactivity between the biomass-derived succinic acid having reduced reactivity due to impurities contained therein and the aliphatic diol, thereby increasing reaction rate and molecular weight. This improves productivity and allows the copolyester to have excellent physical properties. In addition, the multifunctional compound allows the synthesized polymer chain structure to have a fine network structure, thereby providing a resin composition having excellent hydrolysis resistance and durability.

In addition, the multifunctional compound represented by formula 1 is used as a reaction aid in order to solve problems, including long reaction time, weak mechanical properties and rapid time-dependent changes, which are caused by the impurities contained in the biomass-derived succinic acid.

The resin composition produced using the multifunctional compound represented by formula 1 has a number-average molecular weight of 40,000 to 100,000, a molecular weight distribution of 2.0 to 3.8, a melt flow index of 1 g/10 min to 20 g/10 min, as measured at 190° C. and 2,160 kg, and a melting point of 95° C. to 170° C.

In addition, the multifunctional compound represented by formula 2 functions to increase the reaction rate and molecular weight of the resin composition, and thus allows the resin composition to have excellent mechanical properties and storage stability.

The resin composition produced using the multifunctional compound represented by formula 2 has a number-average molecular weight of 40,000 to 100,000, a molecular weight distribution of 2.0 to 3.8, a melt flow index of 1 g/10 min to 20 g/10 min, as measured at 190° C. and 2,160 kg, and a melting point of 95° C. to 170° C.

In particular, a multifunctional monomer, such as glycerol, citric acid or the like, which is generally used as a branching agent in the production of polyester, hardly controls a reaction, making it difficult to obtain a uniform resin composition, and shows a high rate of defects due to gelation of resin. However, the multifunctional compound represented by formula 2 has a difference in the reactive activity of functional groups and contains a long chain, and thus the conditions of use thereof in reaction are not strict compared to those of a multifunctional monomers due to steric hindrance, and may also be used in a wide range of applications. In addition, the multifunctional compound having a long chain is added in the initial stage of an esterification reaction during synthesis of an aliphatic copolyester or an aliphatic/aromatic copolyester, and acts to promote the bonding between polymer chains, thereby rapidly increasing the molecular weight of the reaction product, and also to produce side chains in the molecular main chain of the resulting resin composition, thereby widening the molecular weight distribution, resulting in an increase in the processability of the resulting resin composition.

In addition, the multifunctional compound functions to form side chains in the polymer structure of the resulting resin composition and allows the polymer structure of the resin composition to have a ring structure, thereby helping to increase the tearing strength and elongation of the resulting resin composition and improve the biodegradability of the resin composition.

Hereinafter, a method of producing a functional resin composition using a biomass-derived component according to the present invention and the physical properties of a resin composition produced by the method will be described with reference to examples.

MODE FOR THE INVENTION

Preparation Example 1

A 1-L round bottom flask was charged with nitrogen, and 286.33 g of 1,4-bis(4-hydroxyphenyl)valeric acid, 440 g of a polyethylene glycol having an average molecular weight of 400, and 0.01 g of monobutyltin oxide as a catalyst, were introduced into the flask, and then subjected to an esterification reaction at 210° C. for 2 hours. Then, water as a by-product of the reaction was sufficiently removed, thereby obtaining a multifunctional compound having a structure represented by the following formula 1:

Formula 1

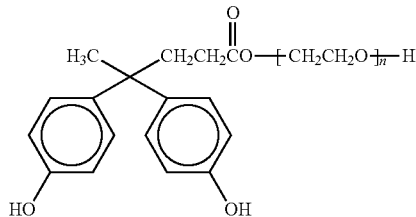

wherein n is an integer ranging from 8 to 10.

Preparation Example 2

A 1-L round bottom flask was charged with nitrogen, and 134.09 g of DL-malic acid, 173.05 g of 1,4-cyclohexanedimethanol and 0.1 g of titanium isopropoxide as a catalyst were introduced into the flask, and then subjected to an esterification reaction at 210° C. for 120 minutes. Then, a theoretical amount (2 moles) of water generated as a reaction by-product per mole of DL-malic acid introduced was sufficiently removed, thereby obtaining a multifunctional compound having a structure represented by the following formula 2:

Formula 2

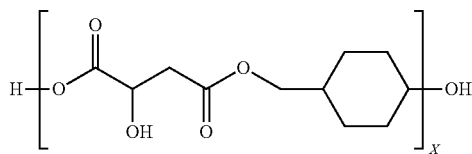

wherein X is an integer ranging from 3 to 5.

Example 1

A 100-L reactor was charged with nitrogen, and 19.42 kg of dimethyl terephthalate and 23.43 kg of 1,4-butanediol were introduced into the reactor and subjected to an esterification reaction at a temperature of 200° C. for 2 hours, followed by removal of methanol. At this time, 10 g of tetrabutyl titanate as a catalyst and 10 g of trimethyl phosphate as a stabilizer were added. After a theoretical amount of methanol was removed, 22.44 kg of biomass-derived succinic acid (Biosuccinium, Reverdia, Netherlands) and 15 g of the multifunctional compound prepared in Preparation Example 1 above were introduced and allowed to react at a temperature of 200° C., followed by removal of water. At this time, 10 g of dibutyltin oxide and 10 g of tetrabutyl titanate were added as a catalyst, and 20 g of trimethyl phosphate was added as a stabilizer. Subsequently to removal of a theoretical amount of water, the temperature was increased and a polycondensation reaction was performed at a temperature of 243° C. under a vacuum of 1.5 Torr for 130 minutes in the presence of 10 g of antimony trioxide as a catalyst. 10 kg of the reaction product resulting from the polycondensation reaction was subjected to a chain extension reaction with 50 g of 1,6-hexamethylene diisocyanate in a twin screw extruder (diameter: 58 mm) at a temperature of 125° C., thereby obtaining a functional resin composition comprising a biomass-derived component.

Example 2

A functional resin composition comprising a biomass-derived component was produced in the same manner as described in Example 1, except that the multifunctional compound prepared in Preparation Example 2 was used.

Example 3

A 100-L reactor was charged with nitrogen, and 18.64 kg of dimethyl terephthalate and 23.43 kg of 1,4-butanediol were introduced into the reactor and subjected to an esterification reaction at a temperature of 200° C. for 2 hours, followed by removal of methanol. At this time, 10 g of tetrabutyl titanate as a catalyst and 10 g of trimethyl phosphate as a stabilizer were added. After a theoretical amount of methanol was removed, 12.28 kg of biomass-derived succinic acid (Biosuccinium, Reverdia, Netherlands) and 10 g of the multifunctional compound prepared in Preparation Example 1 above were introduced and allowed to react at a temperature of 200° C., followed by removal of water. At this time, 10 g of dibutyltin oxide and 10 g of tetrabutyl titanate were added as a catalyst, and 20 g of trimethyl phosphate was added as a stabilizer. Subsequently to removal of a theoretical amount of water, the temperature was increased and a polycondensation reaction was performed at a temperature of 243° C. under a vacuum of 1.5 Torr for 162 minutes in the presence of 10 g of antimony trioxide as a catalyst. 10 kg of the reaction product resulting from the polycondensation reaction was subjected to a chain extension reaction with 25 g of bis-(2,6-diisopropyl-phenylene-2,4-carbodiimide) in a twin screw extruder (diameter: 58 mm) at a temperature of 120° C., thereby obtaining a functional resin composition comprising a biomass-derived component.

Example 4

A functional resin composition comprising a biomass-derived component was produced in the same manner as described in Example 3, except that the multifunctional compound prepared in Preparation Example 2 was used.

Example 5

A 100-L reactor was charged with nitrogen, and 23.62 kg of biomass-derived succinic acid (Biosuccinium, Reverdia, Netherlands) and 23.43 kg of biomass-derived 1,4-butanediol (Myriant Bio-BDO, USA) were introduced into the reactor, and 18 g of the multifunctional compound prepared in Preparation Example 1 above was introduced. Then, the reaction mixture was allowed to react at a temperature of 200° C., followed by removal of water. At this time, 5 g of dibutyltin oxide and 15 g of tetrabutyl titanate were added as a catalyst, and 15 g of trimethyl phosphate was added as a stabilizer. Subsequently to removal of a theoretical amount of water, the temperature was increased and a polycondensation reaction was performed at a temperature of 243° C. under a vacuum of 1.5 Torr for 170 minutes in the presence of 15 g of antimony trioxide as a catalyst. 10 kg of the reaction product resulting from the polycondensation reaction was subjected to a chain extension reaction with 45 g of 1,6-hexamethylene diisocyanate in a twin screw extruder (diameter: 58 mm) at a temperature of 120° C., thereby obtaining a functional resin composition comprising a biomass-derived component.

Example 6

A functional resin composition comprising a biomass-derived component was produced in the same manner as described in Example 5, except that the multifunctional compound prepared in Preparation Example 2 was used.

Example 7

A 100-L reactor was charged with nitrogen, and 23.3 kg of dimethyl terephthalate and 22.53 kg of biomass-derived 1,4-butanediol (Myriant Bio-BDO, USA) were introduced into the reactor and subjected to an esterification reaction at a temperature of 200° C. for 2 hours, followed by removal of methanol. At this time, 12 g of tetrabutyl titanate as a catalyst and 10 g of trimethyl phosphate as a stabilizer were added. After a theoretical amount of methanol was removed, 9.45 kg of biomass-derived succinic acid (Biosuccinium, Reverdia, Netherlands) and 20 g of the multifunctional compound prepared in Preparation Example 1 above were introduced and allowed to react at a temperature of 200° C., followed by removal of water. At this time, 12 g of dibutyltin oxide and 8 g of tetrabutyl titanate were added as a catalyst, and 15 g of trimethyl phosphate was added as a stabilizer. Subsequently to removal of a theoretical amount of water, the temperature was increased and a polycondensation reaction was performed at a temperature of 243° C. under a vacuum of 1.5 Torr for 147 minutes in the presence of 15 g of antimony trioxide as a catalyst. 10 kg of the reaction product resulting from the polycondensation reaction was subjected to a chain extension reaction with 25 g of a carbodiimide compound (STABILIZER 9000, Raschig) in a twin screw extruder (diameter: 58 mm) at a temperature of 120° C., thereby obtaining a functional resin composition comprising a biomass-derived component.

Example 8

A functional resin composition comprising a biomass-derived component was produced in the same manner as described in Example 7, except that the multifunctional compound prepared in Preparation Example 2 was used.

Example 9

A 100-L reactor was charged with nitrogen, and 18.64 kg of dimethyl terephthalate and 23.43 kg of 1,4-butanediol were introduced into the reactor and subjected to an esterification reaction at a temperature of 200° C. for 2 hours, followed by removal of methanol. At this time, 10 g of tetrabutyl titanate as a catalyst and 10 g of trimethyl phosphate as a stabilizer were added. After a theoretical amount of methanol was removed, 11.05 kg of biomass-derived succinic acid (Biosuccinium, Reverdia, Netherlands), 1.52 kg of adipic acid (BASF, Germany) and 10 g of the multifunctional compound prepared in Preparation Example 1 above were introduced and allowed to react at a temperature of 200° C., followed by removal of water. At this time, 10 g of dibutyltin oxide and 10 g of tetrabutyl titanate were added as a catalyst, and 20 g of trimethyl phosphate was added as a stabilizer. Subsequently to removal of a theoretical amount of water, the temperature was increased and a polycondensation reaction was performed at a temperature of 243° C. under a vacuum of 1.5 Torr for 162 minutes in the presence of 10 g of antimony trioxide as a catalyst. 10 kg of the reaction product resulting from the polycondensation reaction was subjected to a chain extension reaction with 25 g of bis-(2,6-diisopropyl-phenylene-2,4-carbodiimide) in a twin screw extruder (diameter: 58 mm) at a temperature of 120° C., thereby obtaining a functional resin composition comprising a biomass-derived component.

Example 10

A functional resin composition comprising a biomass-derived component was produced in the same manner as described in Example 9, except that the multifunctional compound prepared in Preparation Example 2 was used.

Comparative Example 1

A 100-L reactor was charged with nitrogen, and 18.64 kg of dimethyl terephthalate and 23.43 kg of 1,4-butanediol were introduced into the reactor and subjected to an esterification reaction at a temperature of 200° C. for 2 hours, followed by removal of methanol. At this time, 10 g of tetrabutyl titanate as a catalyst and 10 g of trimethyl phosphate as a stabilizer were added. After a theoretical amount of methanol was removed, 12.28 kg of biomass-derived succinic acid (Biosuccinium, Reverdia, Netherlands) was introduced and allowed to react at a temperature of 200° C., followed by removal of water. At this time, 10 g of dibutyltin oxide and 10 g of tetrabutyl titanate were added as a catalyst, and 20 g of trimethyl phosphate was added as a stabilizer. Subsequently to removal of a theoretical amount of water, the temperature was increased and a polycondensation reaction was performed at a temperature of 243° C. under a vacuum of 1.5 Torr for 320 minutes in the presence of 10 g of antimony trioxide as a catalyst, thereby obtaining a resin composition.

Comparative Example 2

A 100-L reactor was charged with nitrogen, and 19.42 kg of dimethyl terephthalate and 23.43 kg of 1,4-butanediol were introduced into the reactor and subjected to an esterification reaction at a temperature of 200° C. for 2 hours, followed by removal of methanol. At this time, 10 g of tetrabutyl titanate as a catalyst and 10 g of trimethyl phosphate as a stabilizer were added. After a theoretical amount of methanol was removed, 22.44 kg of succinic acid was introduced and allowed to react at a temperature of 200° C., followed by removal of water. At this time, 10 g of dibutyltin oxide and 10 g of tetrabutyl titanate were added as a catalyst, and 20 g of trimethyl phosphate was added as a stabilizer. Subsequently to removal of a theoretical amount of water, the temperature was increased and a polycondensation reaction was performed at a temperature of 243° C. under a vacuum of 1.5 Torr for 200 minutes in the presence of 10 g of antimony trioxide as a catalyst, thereby obtaining a resin composition.

Comparative Example 3

A 100-L reactor was charged with nitrogen, and 18.64 kg of dimethyl terephthalate and 23.43 kg of 1,4-butanediol were introduced into the reactor and subjected to an esterification reaction at a temperature of 200° C. for 2 hours, followed by removal of methanol. At this time, 10 g of tetrabutyl titanate as a catalyst and 10 g of trimethyl phosphate as a stabilizer were added. After a theoretical amount of methanol was removed, 12.28 kg of succinic acid was introduced and allowed to react at a temperature of 200° C., followed by removal of water. At this time, 10 g of dibutyltin oxide and 10 g of tetrabutyl titanate were added as a catalyst, and 20 g of trimethyl phosphate was added as a stabilizer. Subsequently to removal of a theoretical amount of water, the temperature was increased and a polycondensation reaction was performed at a temperature of 243° C. under a vacuum of 1.5 Torr for 192 minutes in the presence of 10 g of antimony trioxide as a catalyst, thereby obtaining a resin composition.

Comparative Example 4

A 100-L reactor was charged with nitrogen, and 18.64 kg of dimethyl terephthalate and 23.43 kg of 1,4-butanediol were introduced into the reactor and subjected to an esterification reaction at a temperature of 200° C. for 2 hours, followed by removal of methanol. At this time, 10 g of tetrabutyl titanate as a catalyst and 10 g of trimethyl phosphate as a stabilizer were added. After a theoretical amount of methanol was removed, 15.2 kg of adipic acid (BASF, Germany) was introduced and allowed to react at a temperature of 200° C., followed by removal of water. At this time, 5 g of dibutyltin oxide and 15 g of tetrabutyl titanate were added as a catalyst, and 15 g of trimethyl phosphate was added as a stabilizer. Subsequently to removal of a theoretical amount of water, the temperature was increased and a polycondensation reaction was performed at a temperature of 243° C. under a vacuum of 1.5 Torr for 220 minutes in the presence of 15 g of antimony trioxide as a catalyst, thereby obtaining a resin composition.

Comparative Example 5

A 100-L reactor was charged with nitrogen, and 23.3 kg of dimethyl terephthalate and 22.53 kg of 1,4-butanediol were introduced into the reactor and subjected to an esterification reaction at a temperature of 200° C. for 2 hours, followed by removal of methanol. At this time, 12 g of tetrabutyl titanate as a catalyst and 10 g of trimethyl phosphate as a stabilizer were added. After a theoretical amount of methanol was removed, 11.69 kg of adipic acid (BASF, Germany) was introduced and allowed to react at a temperature of 200° C., followed by removal of water. At this time, 12 g of dibutyltin oxide and 8 g of tetrabutyl titanate were added as a catalyst, and 15 g of trimethyl phosphate was added as a stabilizer. Subsequently to removal of a theoretical amount of water, the temperature was increased and a polycondensation reaction was performed at a temperature of 243° C. under a vacuum of 1.5 Torr for 196 minutes in the presence of 15 g of antimony trioxide as a catalyst, thereby obtaining a resin composition.

The tensile strength, elongation and biodegradability of each of the resin compositions produced in Examples 1 to 8 and Comparative Examples 1 to 5 above were measured, and the results of the measurement are shown in Table 1 below.

For measurement, film samples having a thickness of 100 μm were manufactured from each of the resin compositions using a hot press. The tensile strength and elongation of each of the film samples were measured using a universal testing machine in accordance with ASTM D638 standards. For evaluation of biodegradability, each of the film samples manufactured as described above was cut to a size of 10 cm (W)×10 cm (L), and the cut film samples were buried 30 cm below the soil surface and then collected after 12 months, and the biodegradability of the collected film samples was measured by the weight loss method.

TABLE 1

| Classification | Tensile Strength (kgf/cm$^2$) | Elongation Ratio (%) | Bio-degradability (%) |
|---|---|---|---|
| Example 1 | 398 | 200 | 79.9 |
| Example 2 | 401 | 250 | 78.8 |
| Example 3 | 351 | 675 | 76.9 |
| Example 4 | 356 | 650 | 75.3 |
| Example 5 | 412 | 150 | 76.4 |
| Example 6 | 420 | 150 | 76.3 |
| Example 7 | 374 | 450 | 56.3 |
| Example 8 | 381 | 475 | 55.1 |
| Example 9 | 361 | 475 | 63.4 |
| Example 10 | 368 | 500 | 70.1 |
| Comparative Example 1 | 168 | 75 | 93.1 |
| Comparative Example 2 | 378 | 125 | 89.7 |
| Comparative Example 3 | 392 | 575 | 80.5 |
| Comparative Example 4 | 309 | 450 | 80.2 |
| Comparative Example 5 | 367 | 400 | 57.3 |

As can be seen in Table 1 above, the result compositions produced in Examples 1 to 10 of the present invention showed significantly improved mechanical properties, such as tensile strength or elongation, compared to those of the resin compositions produced in Comparative Examples 1 to 5, while the bioavailability thereof was comparable to that of the resin compositions produced in Comparative Examples 1 to 5.

In addition, the number-average molecular weights, molecular weight distributions, melting points and melt flow indices of the resin composition produced in Examples 1 to 8 and Comparative Examples 1 to 5 above were measured, and the results of the measurement are shown in Table 2 below.

For measurement, the number-average molecular weights and the molecular weights distribution were measured by gel permeation chromatography at a temperature of 35° C. by means of a system equipped with a polystyrene-packed column. The chromatography was performed using chloroform as a developing solvent at a sample concentration of 5 mg/mL and a solvent flow rate of 1.0 mL/min.

In addition, the melting points were measured using a differential scanning calorimeter under a nitrogen atmosphere over a temperature ranging from 20° C. to 200° C. at a heating rate of 10° C./min, and the melt flow indices were measured in accordance with ASTM D1238 standards under the conditions of 190° C. and 2,160 g.

TABLE 2

| Classification | Number-Average Molecular Weight | Molecular Weight Disribution | Melting Point (° C.) | Melt Flow Indices (g/10 minutes) |
|---|---|---|---|---|
| Example 1 | 58,400 | 3.29 | 113 | 3.2 |
| Example 2 | 68,200 | 3.37 | 112 | 2.6 |
| Example 3 | 53,200 | 3.61 | 126.7 | 3.6 |
| Example 4 | 85,900 | 3.53 | 128 | 1.8 |

TABLE 2-continued

| Classification | Number-Average Molecular Weight | Molecular Weight Disribution | Melting Point (° C.) | Melt Flow Indices (g/10 minutes) |
|---|---|---|---|---|
| Example 5 | 83,320 | 3.31 | 113 | 2.1 |
| Example 6 | 89,700 | 3.42 | 114 | 1.4 |
| Example 7 | 59,998 | 2.92 | 160 | 3.1 |
| Example 8 | 58,412 | 2.55 | 171 | 3.3 |
| Example 9 | 56,300 | 3.21 | 118 | 3.2 |
| Example 10 | 58,280 | 3.33 | 118.2 | 3.4 |
| Comparative Example 1 | 28,345 | 3.02 | 118 | 4.1 |
| Comparative Example 2 | 53,112 | 2.47 | 108.2 | 2.5 |
| Comparative Example 3 | 48,032 | 2.52 | 118 | 5.3 |
| Comparative Example 4 | 53,312 | 2.64 | 126 | 3.8 |
| Comparative Example 5 | 57,228 | 2.42 | 166 | 3.5 |

As can be seen in Table 2 above, the number-average molecular weights produced in Examples 1 to 10 of the present invention were significantly higher than those of the resin compositions produced in Comparative Examples 1 to 5.

As described above, the functional resin composition comprising a biomass-derived component according to the present invention provides a functional resin, which has excellent processability, moldability, tearing strength and tensile strength and does not easily change over time due to its excellent hydrolysis resistance.

Although the preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A functional resin composition comprising:
a biomass-derived component; an alcohol component; a chain extender; and
a multifunctional compound,
wherein the biomass-derived component is biomass-derived succinic acid alone or a mixture of biomass-derived succinic acid and fossil-derived aliphatic dicarboxylic acid, and
wherein the multifunctional compound is a compound represented by the following Formula 1, which is produced by esterification of 4,4-bis(4-hydroxyphenyl) valeric acid with polyethylene glycol:

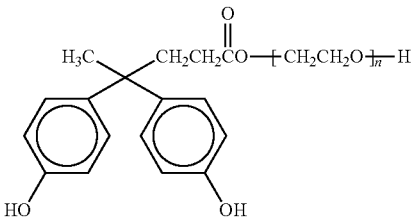

Formula 1 wherein n is 8 to 10.

2. The functional resin composition of claim 1, further comprising aromatic dicarboxylic acid.

3. The functional resin composition of claim 1, wherein the fossil-derived aliphatic dicarboxylic acid is one or more selected from the group consisting of oxalic acid, malonic acid, succinic acid, glutaric acid, adipic acid, pimelic acid, suberic acid, azelaic acid, sebacic acid, and anhydride derivatives thereof.

4. The functional resin composition of claim 1, wherein the aromatic dicarboxylic acid is one or more selected from the group consisting of dimethyl terephthalate, terephthalic acid, isophthalic acid, and naphthoic acid.

5. The functional resin composition of claim 1, wherein the alcohol component is one or more selected from the group consisting of biomass-derived 1,4-butanediol and fossil-derived aliphatic diol.

6. The functional resin composition of claim 5, wherein the fossil-derived aliphatic diol is one or more selected from the group consisting of ethylene glycol, 1,3-propanediol, neopentyl glycol, propylene glycol, 1,2-butanediol, 1,4-butanediol, and 1,6-hexanediol.

7. The functional resin composition of claim 1, wherein the chain extender is an isocyanate compound or a carbodiimide compound.

* * * * *